(12) United States Patent
Xu et al.

(10) Patent No.: US 9,437,228 B2
(45) Date of Patent: Sep. 6, 2016

(54) NEAR FIELD TRANSDUCER FOR HEAT ASSISTED MAGNETIC RECORDING

(71) Applicant: Purdue Research Foundation, West Lafayette, IN (US)

(72) Inventors: Xianfan Xu, West Lafayette, IN (US); Edward Kinzel, Rolla, MO (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 14/666,237

(22) Filed: Mar. 23, 2015

(65) Prior Publication Data

US 2015/0269959 A1 Sep. 24, 2015

Related U.S. Application Data

(60) Provisional application No. 61/969,312, filed on Mar. 24, 2014.

(51) Int. Cl.
| | |
|---|---|
| *G11B 11/00* | (2006.01) |
| *G11B 5/48* | (2006.01) |
| *G11B 5/31* | (2006.01) |
| *G11B 5/60* | (2006.01) |
| *G11B 5/00* | (2006.01) |

(52) U.S. Cl.
CPC ............ *G11B 5/4866* (2013.01); *G11B 5/314* (2013.01); *G11B 5/3163* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,696,372 | A * | 12/1997 | Grober ................ | B82Y 20/00 250/216 |
| 6,407,708 | B1 * | 6/2002 | Jasper, Jr. ............ | H01Q 15/08 343/701 |
| 6,795,380 | B2 * | 9/2004 | Akiyama .............. | G11B 5/127 369/13.17 |
| 7,155,732 | B2 | 12/2006 | Rausch et al. | |
| 7,440,660 | B1 | 10/2008 | Jin et al. | |
| 7,518,815 | B2 * | 4/2009 | Rottmayer ........... | B82Y 10/00 360/59 |
| 7,835,102 | B2 | 11/2010 | Takayama et al. | |
| 7,873,969 | B2 | 1/2011 | Rausch | |
| 7,933,169 | B2 * | 4/2011 | Matsumoto .......... | B82Y 10/00 360/59 |
| 8,139,447 | B2 | 3/2012 | Sasaki et al. | |
| 8,194,511 | B2 | 6/2012 | Sasaki et al. | |
| 8,194,512 | B2 | 6/2012 | Stipe | |
| 2010/0091618 | A1 * | 4/2010 | Schabes .............. | B82Y 10/00 369/13.02 |
| 2011/0055984 | A1 * | 3/2011 | Cheng ................. | B82Y 20/00 850/32 |
| 2014/0313872 | A1 * | 10/2014 | Rawat ................. | G11B 13/045 369/13.33 |

* cited by examiner

*Primary Examiner* — Tan X Dinh
(74) *Attorney, Agent, or Firm* — Purdue Research Foundation

(57) ABSTRACT

An antenna for heat assisted magnetic recording is disclosed. The antenna includes an optically opaque material and an optically transparent material positioned on the optically opaque material, the optically transparent material includes a half bowtie shape which includes a first half-wing substantially shaped in form of a right angle trapezoid, having a height substantially equal to the overall height of the half bowtie, a second half-wing substantially shaped in form of a mirror image of the first half-wing and formed proximate and coupled to the first half-wing by a substantially rectangular aperture having an aperture width and an aperture height. The aperture height is as small as 1 nm.

4 Claims, 12 Drawing Sheets

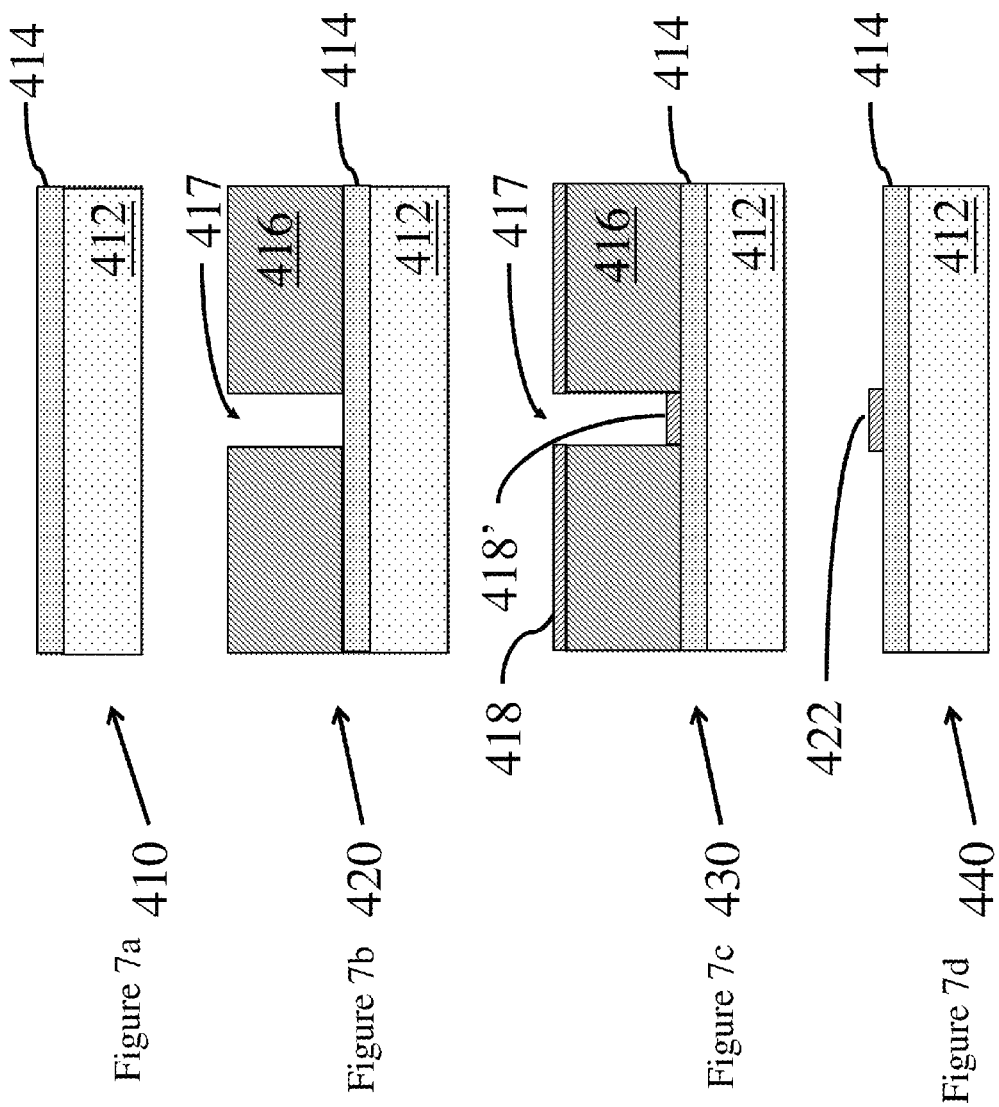

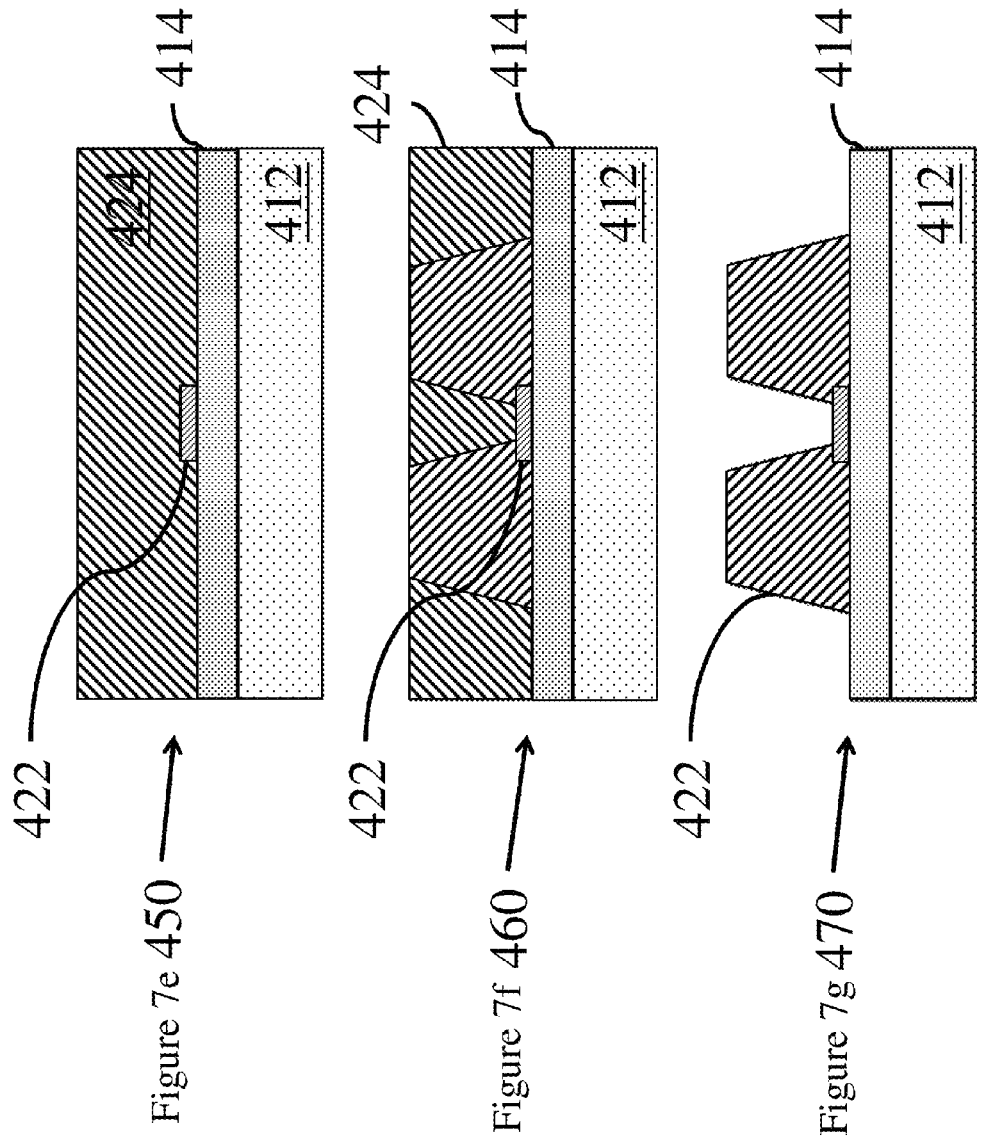

NEAR FIELD TRANSDUCER FOR HEAT ASSISTED MAGNETIC RECORDING

CROSS-REFERENCE TO RELATED APPLICATIONS

The present U.S. patent application is related to and claims the priority benefit of U.S. Provisional Patent Application Ser. No. 61/969,312, filed Mar. 24, 2014, the contents of which are hereby incorporated by reference in their entirety into the present disclosure.

TECHNICAL FIELD

The present disclosure generally relates to electronic data storage devices, and particularly to high density data storage devices.

BACKGROUND

This section introduces aspects that may help facilitate a better understanding of the disclosure. Accordingly, these statements are to be read in this light and are not to be understood as admissions about what is or is not prior art.

Heat assisted magnetic recording (HAMR) has been identified by the data storage industry as the technology for next generation data storage. As the density of data in a magnetic hard drive continues to increase and the relative bit size decreases, the magnetic storage medium must be made of a material with high coercivity to guarantee its stability. At some point as storage density increases, the bit size is so small and the coercivity correspondingly so high that the magnetic field used for writing data cannot be made strong enough, with the result that data can no longer be written to the hard drive medium using the magnetic field available in a read-write head. HAMR mitigates this problem by temporarily and locally changing the coercivity of the magnetic storage medium by using a laser beam to radiate the medium through an optical near field transducer (NFT) and raising the temperature of the medium above the Curie temperature. As a result, the medium temporarily loses coercivity and a realistically achievable magnetic field can be achieved which for the read-write head can write data to the recording medium.

Since the heating laser would have a wavelength of approximately 800 nm, the minimum spot size that can be produced using far-field optics would be on the order of 400 nm, determined by the physical diffraction limit. Such a spot size is too large as the next generation data storage require bit sizes of tens of nanometers, and thus conventional far-field optics is not suitable for HAMR and next generation magnetic data storage.

Nanoscale optical antennas or NFT are used to focus light to a nanoscale spot beyond the physical diffraction limit of light. FIG. 1a depicts a top view of an example of a planar nanoscale optical antenna similar to the one found in the prior art as provided in, e.g., U.S. Pat. No. 7,518,815 to Rottmayer et al., the difference being that the structure discussed in the '815 patent discloses a bowtie antenna, whereas FIG. 1a depicts a bowtie aperture antenna which has a reversed geometry. In the example shown in FIG. 1a, a nanoscale optical antenna, or NFT, 100 having a full bowtie shape aperture is shown. In the example shown, the antenna 100 comprises a thin metal film 101 having two wings (also referred to as aperture or tips) 102 in the thin metal film 101. The wings 102 which form the aperture exposes an optically transparent substrate 103 having the metal thin film 101 deposited thereon. A gap size 104 is depicted between the points of the aperture 102 and labeled "g."

As discussed above, the planer bowtie-shaped aperture depicted in FIG. 1a is made in a thin metal film (about tens of nm to over 100 nm thick metal on a transparent substrate). The wings 102 of the antenna 100 are separated by the gap 104 of width g. When illuminated by a laser beam, electric potential and hence currents are induced in the wings 102 of the antenna 100, which flow to the tips 102. Because of the gap g (104), charges are accumulated at the tips 102, resulting in a displacement current across the gap which radiates similar to a Hertzian dipole. In other words, the antenna 100 receives radiation over a large area surrounding the aperture and re-radiates the received radiation through the displacement current formed in a small region in the gap g (104). The focusing resolution depends on the gap size g only, not the wavelength; and the transmission efficiency is orders of magnitude higher than a conventional aperture. FIG. 1b shows simulated results of the electric-field distribution at 1 nm above a bowtie aperture. An optical spot as small as 7 nm×4 nm is obtained, with electric field more than 240 times higher and the optical intensity 55,000 times higher than the incident laser intensity. The field produced by bowtie antenna diverges quickly within 10 s of nm, so it needs to be used in near field (as a near field transducer). In a magnetic disc drive, the read-write head is only a few nm above the storage medium during operation; therefore, the divergence of light from bowtie antenna is not an issue for the NFT in a magnetic disc drive.

The gap size 104 determines the size of a light spot transmitted when the antenna 100 is illuminated with a light source. In various embodiments the gap size 104 is desired to be in a range from about several nm to tens of nm. In other embodiments the gap size may be larger or smaller. Because the gap size 104 determines transmitted spot size, the designed and fabricated gap size 104 will be highly variable based on the desired application. In the example involving magnetic data recording wherein the antenna 100 is used to heat a spot in order to assist magnetic writing, the smaller spot size will allow a greater data density to be written to a magnetic storage medium. Thus, the gap size 104 of 5 nm and below is advantageous for HAMR.

Referring to FIG. 2 surrounding a bowtie aperture antenna, grooves at the entrance side (i.e., the side facing the incoming laser beam), can boost the field intensity by more than one order of magnitude. The mechanism of field enhancement is based on the grating effect, i.e., diffraction of propagating waves instead of other phenomena such as surface plasmons. Proper design of the grooves at the exit side can help to collimate the beam. This effect is due to the interference of the scattered surface plasmon polariton (SPP) waves at the edges of grooves that help to cancel or reduce the intensity of side lobes.

However, achieving such a gap size 104 is exceedingly difficult and costly. There are currently no cost-effective ways to generate gaps of such small size in a repeated high quality manner. Therefore, there is a need for new optical arrangements which can generate and utilize light spots tens of nanometers in size for writing data to the data storage devices.

SUMMARY

An antenna for heat assisted magnetic recording is disclosed. The antenna includes an optically opaque material and an optically transparent material positioned on the optically opaque material, the optically transparent material includes a half bowtie shape which includes a first half-wing substantially shaped in form of a right angle trapezoid, having a height substantially equal to the overall height of the half bowtie, a second half-wing substantially shaped in form of a mirror image of the first half-wing and formed proximate and coupled to the first half-wing by a substantially rectangular aperture having an aperture width and an aperture height. The aperture height is as small as 1 nm.

A method to manufacture an antenna for heat assisted magnetic recording is disclosed. The method includes depositing a metal layer on a substrate, depositing a first photoresist on the metal layer, providing an opening having a width thereby exposing the metal layer by the width, depositing a layer of oxide having a thickness on the first photoresist and the exposed metal layer, depositing a negative tone resist on the oxide disposed in the opening, removing the deposited oxide and the first photoresist from the metal, leaving the deposited oxide under the negative tone resist, removing the negative tone resist leaving the deposited oxide on the metal layer in the opening, depositing a second photoresist on the metal layer and the oxide disposed over the metal in the opening, hardening the second photoresist in ridge structures on either sides of the oxide in the opening, removing the unhardened second photoresist; and depositing a second metal layer encasing the hardened second photoresist.

BRIEF DESCRIPTION OF DRAWINGS

FIG. 1b shows simulated results of electric-field distribution at 1 nm above the full bowtie aperture of FIG. 1a.

FIGS. 7a-7h are cross sectional views depicting a process by which the half bowtie optical antenna of the present disclosure can be made.

FIG. 8b is a schematic representation of cross section of the half bowtie of FIG. 8a.

DETAILED DESCRIPTION

Figure 1A:
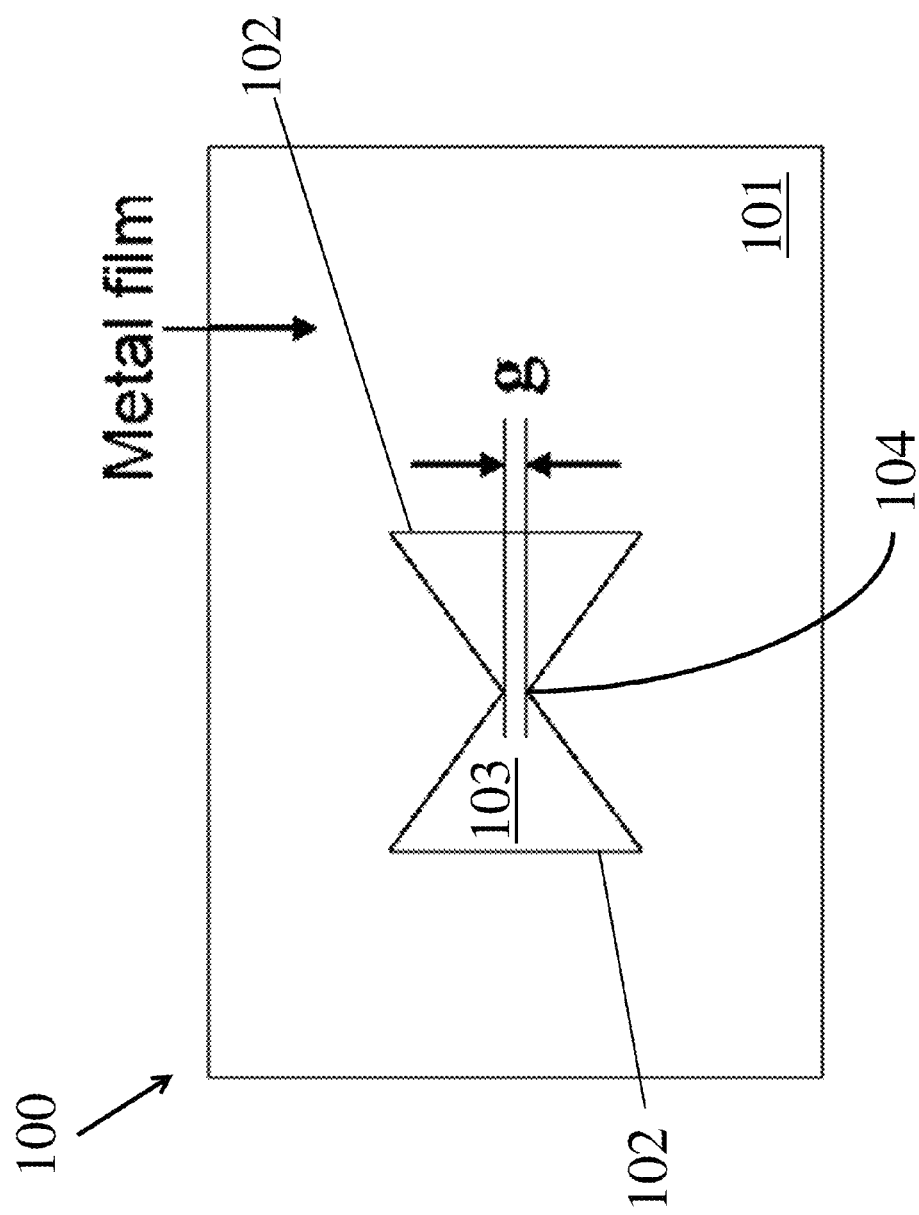
FIG. 1a is a top view representation of a prior art optical antenna shaped in the form of a full bowtie having an aperture used in heat assisted magnetic recording applications.
Figure 1B:
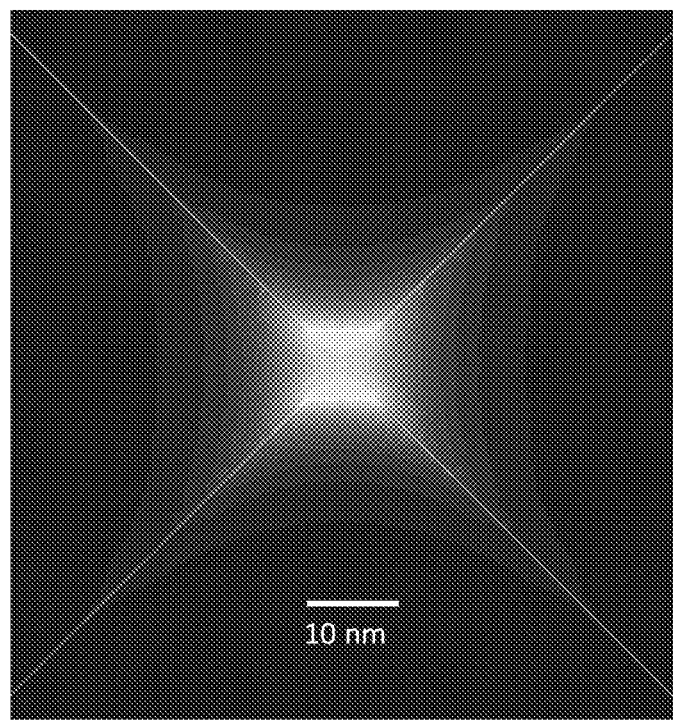

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 3:
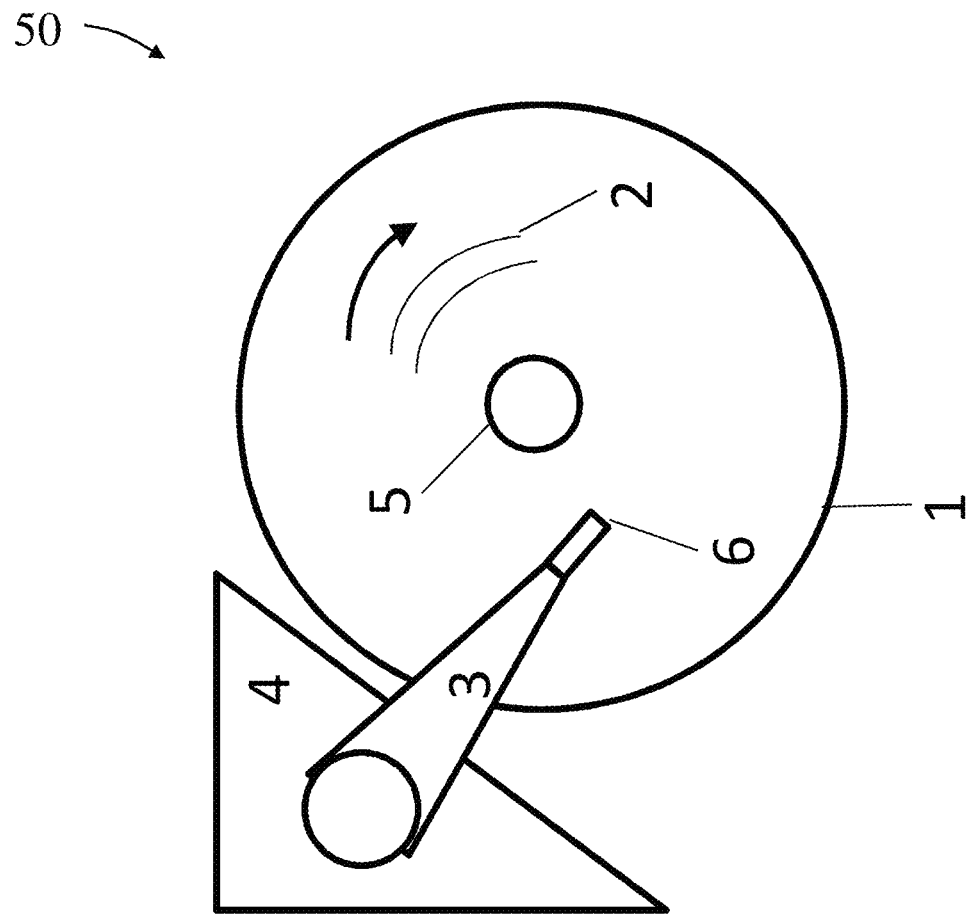
FIG. 3 is a top view of components of a Hard Disk Drive (HDD) having a head assembly.
Figure 4:
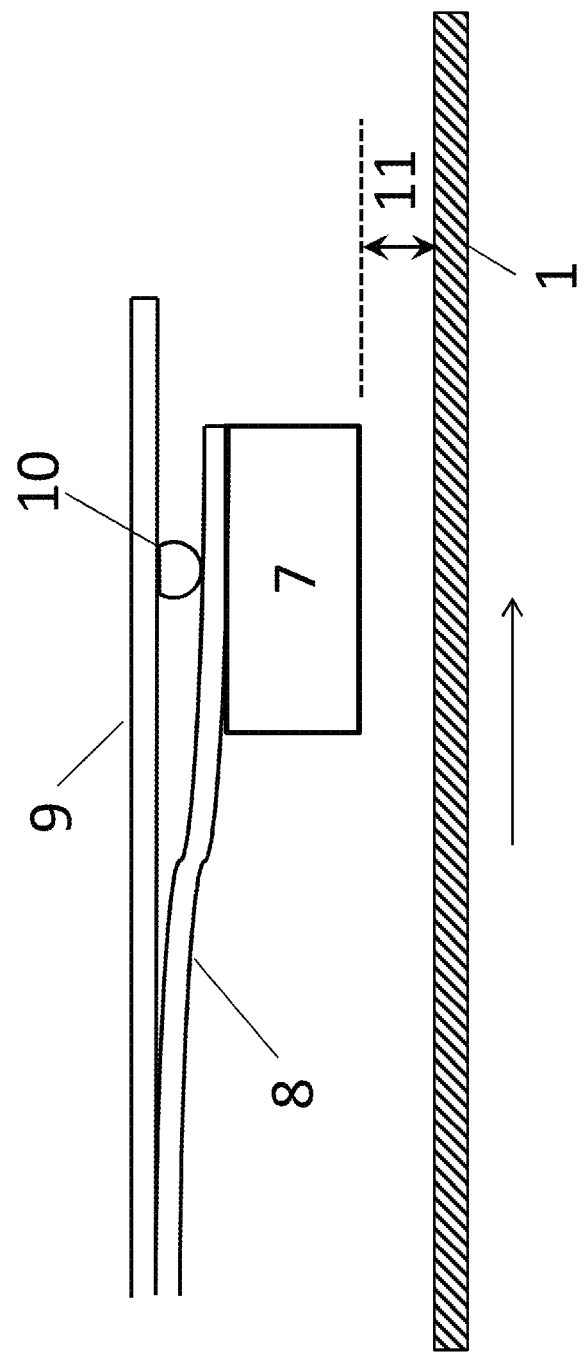
FIG. 4 is a side view which shows further components of the head assembly of FIG. 3 showing a head unit.
Figure 5:
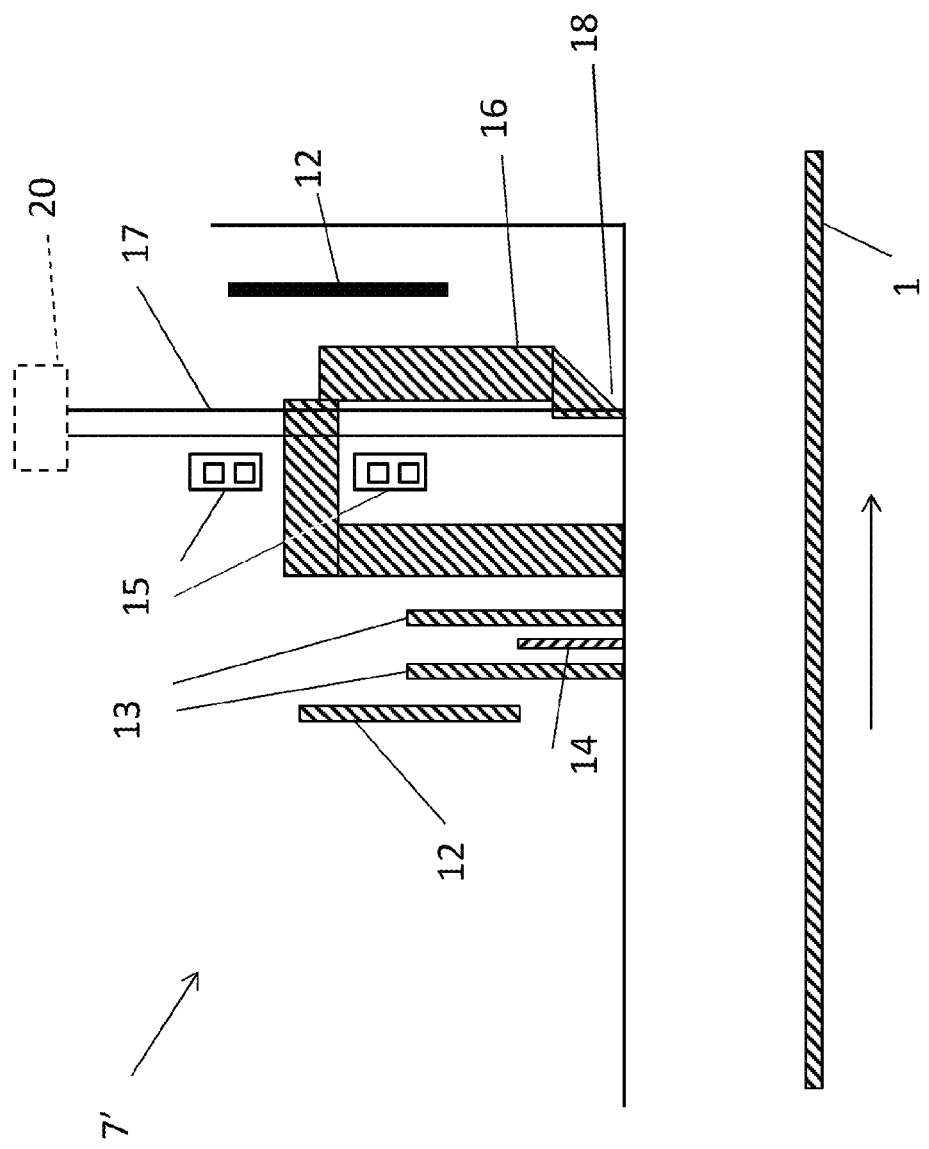
FIG. 5 is a side view which shows further details of the head unit.

The details of the implementation of Heat assisted magnetic recording (HAMR) technology are shown in FIG. 3 through FIG. 5. FIG. 3 shows a top view of components of a Hard Disk Drive (HDD) 50; specifically, a magnetic recording disk 1, a track onto which data is stored 2, an actuator arm 3, a voice coil motor assembly 4, a spindle 5, and a head/gimbal assembly 6. FIG. 4 shows further components of the head/gimbal assembly 6, from a side view. A slider 7 rests against the gimbal 8. The slider 2 and gimbal 8 arrangement is suspended from a bar 9 and positioned with the help of a dimple 10. The bottom surface of the slider 7 is the air bearing slider (ABS), with a flying height 11 of the slider 7 above the magnetic recording disk surface 1. FIG. 5 shows further details of a head unit 7' located inside the slider 7, from a closer lateral perspective. The head unit 7' includes heaters 12 as part of a height correction system, rear shields 13, a read head 14, write coils 15 around a return pole, and the write pole 16. A path of light 17 is used to provide light in order to heat the magnetic medium (magnetic recording disk 1), which can be a waveguide or can be based on free-space optics. The guided light can be from a light source 20, e.g. a laser. The near-field transducer (NFT) or nanoscale optical antenna 18 causes local heating from the light illumination.

In order to address the limitations described above and to advance the art of data storage, an NFT for HAMR in the shape of half bowtie aperture and its manufacturing process are disclosed herein. The NFT is a nanoscale optical antenna for focusing light into nanometer-size spots with high intensity. The antenna is incorporated into a system for writing of data into a magnetic storage medium. The optical antenna enables the magnetic storage device to write data through a method of heating a nanoscale region within a magnetic storage medium to a point wherein the coercivity of the magnetic storage medium is reduced and magnetically writing to the region with a magnetic write head is made possible. Following the recording of magnetic information to the region, the region is allowed to cool, thereby increasing the coercivity again in the direction of the original coercivity of the medium.

Figure 6:
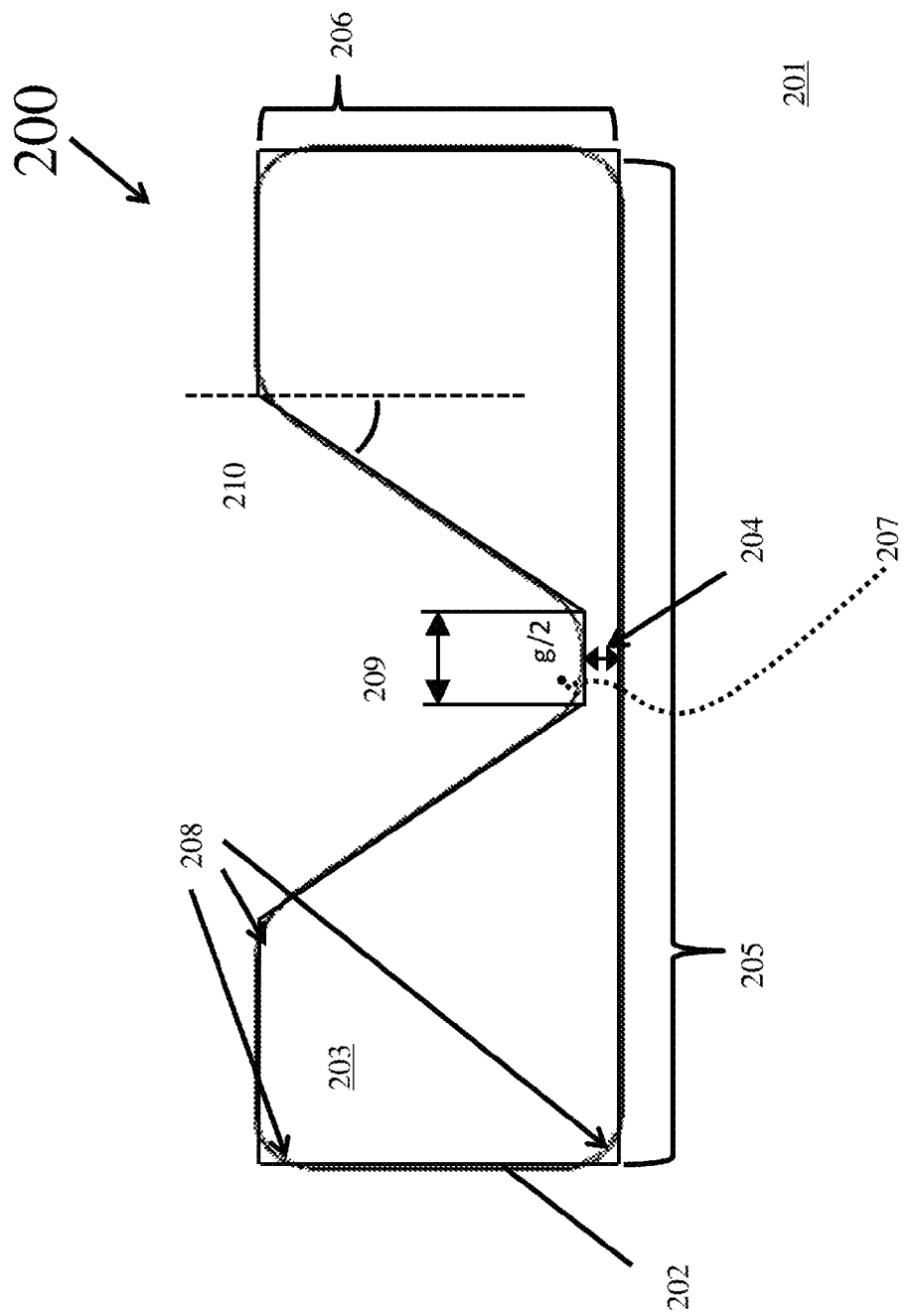
FIG. 6 is a cross sectional view of an optical antenna shaped in the form of a half bowtie having an aperture used in heat assisted magnetic recording applications, according to the present disclosure.

A novel variation of the full bowtie antenna example described in the background section of the present disclosure is a half bowtie aperture embodiment depicted in FIG. 6, which performs similarly compared with a full bowtie aperture, however, constructed entirely differently. The center symmetry line in a full bowtie corresponds to mirror images of the two half bowties. The half bowtie embodiment is a vertically generated structure as compared to the planar structure depicted in FIG. 1a. In other words, the structure depicted in FIG. 6 is a cross sectional view, while the structure shown in FIG. 1a is based on a top view. Similar to the example shown in FIG. 1a, the antenna 200 has an aperture 202 opening to an optically transparent substrate 203 wherein the aperture 202 is formed in a thin metal film 201. A characteristic gap size 204 is depicted as g/2. For the half bowtie optical nanoscale antenna 200, the aperture 202 is formed by a single tip separated from a straight edge having a length 205 by the gap size 204. A total height of the aperture 202 is determined by a straight edge with a height 206. Fabrication characteristics are shown as fillets 208 and a radius of curvature 207 of a tip width 209 in the aperture 202. A tip sharpness angle 210 is also shown.

This disclosure describes a completely new design of a half bowtie aperture, charging from a planer geometry described in FIG. 6 to a vertical geometry. This half bowtie aperture embodiment and its manufacturing process are described herein.

This half bowtie optical antenna 200 can be fabricated using a standard lithography method as discussed below. In addition, the gap g/2 in the half bowtie, which determines the size of focused light spot, can be made very small using the disclosed method (down to a few nm), significantly improving the possibility of achieving the required spot size in HAMR.

For the half bowtie antenna 200 embodiment, a size determined by the length 205 and the height 206, the gap size 204, the tip width 209, the tip angle 210, as well as other dimensions will provide dramatically enhanced operational ranges, just as in the full bowtie aperture antenna example found in FIG. 1a. The thin film 201 may comprise appropriate metals, e.g., gold which can be used for its beneficial material properties. Further, the optically transparent substrate 203 may comprise various materials. In one embodiment glass or oxide or other types of metal oxide can be used. The length 205 and height 206 are optimized to impedance match to the recording media. Typically, this will be selected so the cutoff wavelength of the waveguide matches the excitation laser and to adjust the impedance of the waveguide. In this case energy couples to the NFT directly. Alternatively, dimensions can be selected to have a longer cutoff wavelength and propagation in the waveguide. In this case energy can propagate in the waveguide and the depth into the page of the NFT controls the resonance.

One advantage of the new design of the half bowtie embodiment as NFT disclosed here is that it can be made, using the disclosed method, according to a standard top-down lithography processes to achieve a very small g/2, of the order of a few nm, with high consistency. Therefore, an optical spot as small as about 5-20 nm can be produced for high density data storage. FIGS. 7a-h are cross sectional schematic representations which disclose the fabrication process along with FIG. 9 which is a flowchart depicting the steps of a process flow 500 for a half bowtie optical antenna.

Figure 9:
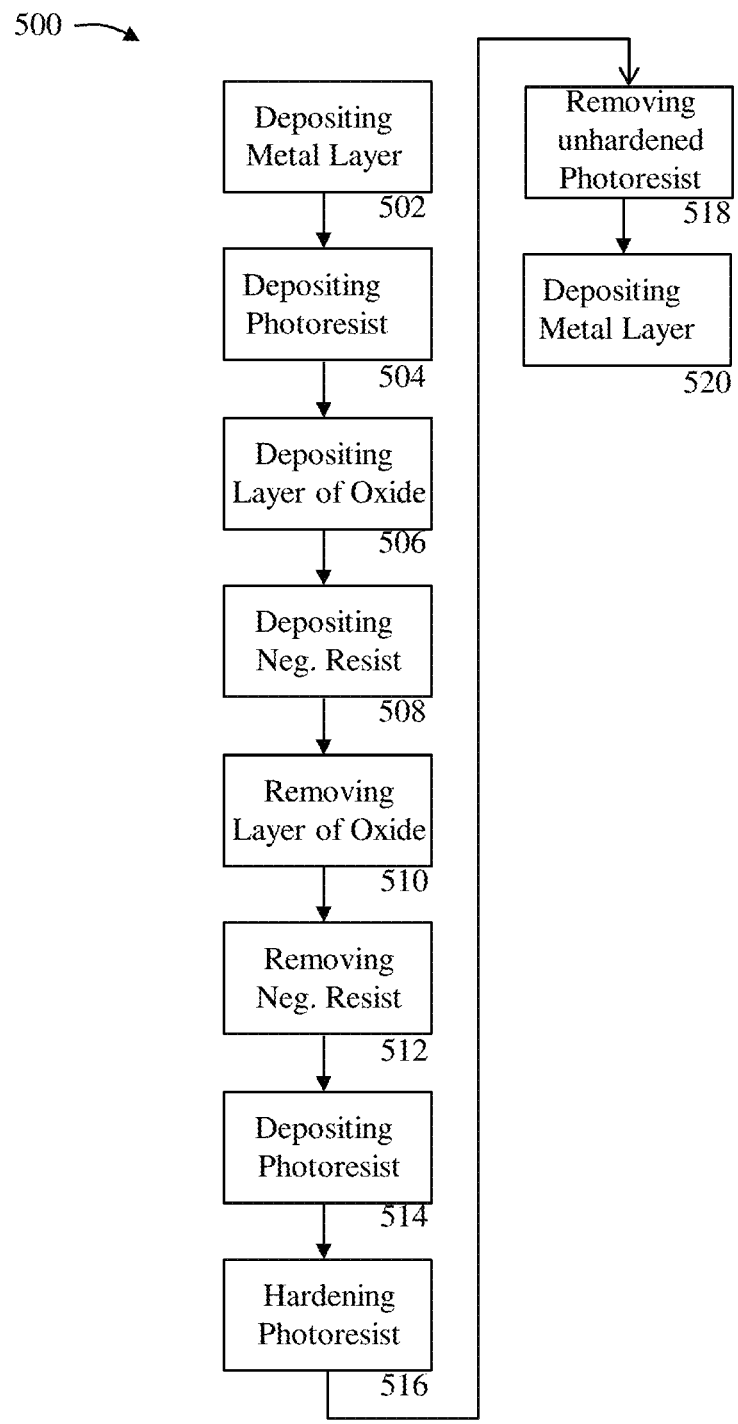
FIG. 9 is a flowchart showing the process of making the optical antenna of FIG. 6.

FIG. 7a depicts a deposition step 410 wherein a thin metal layer 414 (of about 20 nm) is deposited on a magnetic pole layer 412 (step 502 in FIG. 9). In one embodiment the metal layer 414 is gold, but other metals or alloys could be used. Of particular benefit are materials supporting surface plasmon polaritons. In one embodiment the magnetic pole layer 412 is iron, but other magnetic material could be used. FIG. 7b depicts a photoresist (PR) deposition step 420 wherein a PR 416 is deposited on the metal layer 414 (step 504 in FIG. 9). The PR 416 is patterned by a typical photolithography process to produce an opening 417 as shown. In one embodiment the opening 417 is 20-30 nm wide or smaller and will determine the maximum width 209 of a gap region in the half bowtie optical antenna as describe in reference to FIG. 5. The opening 417 exposes the metal layer 414.

FIG. 7c depicts an oxide deposition step 430 (step 506 in FIG. 9) wherein a thin layer of oxide 418 and 418' are deposited on the PR 416 and the exposed metal layer 414 in the opening 417, respectively. In one embodiment the thin oxide layer 418 has a thickness of about 5 nm. The thickness of the oxide layer 418 and 418' can be varied and will determine the size of the gap 204 of the half bowtie structure described with reference to FIG. 5. In one embodiment the thin oxide layer 418 and 418' are formed by a method of atomic layer deposition (ALD). The thickness of the oxide layer in one embodiment is between 1-5 nm. It should be appreciated that the thickness of the oxide layer 418 is the size of the gap in half bowtie, and determines the size of the localized light spot. Since making a thin layer of oxide is much easier than fabricating a gap of small dimension using focused ion beam (FIB) or other methods, e.g., depositing a 5 nm oxide layer is highly advantageous over removing material with 5 nm resolution, the method described herein provides a better control and capability to produce a small gap in the antenna and a smaller light spot. Using ALD, the consistency of making a 1-5 nm film can be controlled within +/−0.1 nm. A gap of the order of 5 nm will produce a light spot ~16 nm that is needed for a storage density over 2 TBit/in$^2$.

FIG. 7d depicts a PR removal step 440 wherein the PR 416 is removed and a thin layer of oxide 422 remains on the metal layer 414. The thin oxide structure 422 remaining will have length and thickness that approximately determine the gap 204 and the width of the tip 209, respectively, of the half bowtie structure described in reference to FIG. 5. Alternatively, without loss of generality, the patterning of the thin oxide layer could be accomplished by first depositing the oxide over the metal layer, then using a negative tone resist to mask off the gap region and etching the oxide not covered by the resist followed by removing the negative resist (steps 508, 510 and 512 in FIG. 9).

FIG. 7e depicts a second PR step 450 (step 514 in FIG. 9) wherein a PR 424 is deposited on the metal layer 414 and the oxide layer 422. In one embodiment the PR 424 is a negative PR. In one embodiment the PR 424 comprises hydrogen silsesquioxane (HSQ). FIG. 7f depicts an exposure step 460 wherein the negative PR 424 is exposed in regions associated with reference numeral 426 producing a hardened PR structure 426 (step 516 in FIG. 9). The width of the ridge is defined in this step which will control the maximum dimension of the spot in the recording medium. An alternative embodiment comprises using positive PR and exposing a region surrounding 426 so as to define the region 426. FIG. 7g depicts a development step 470 wherein the loose PR 424 surrounding the hardened PR 426 is removed (step 518 in FIG. 9). The taper in the wings 210 (see FIG. 5) will be exposure dependent. It is reasonable to expect some slight curvature 208 at the upper corners of the wings. But curvature at the upper corners does not affect the performance of the NFT.

Figure 7H:
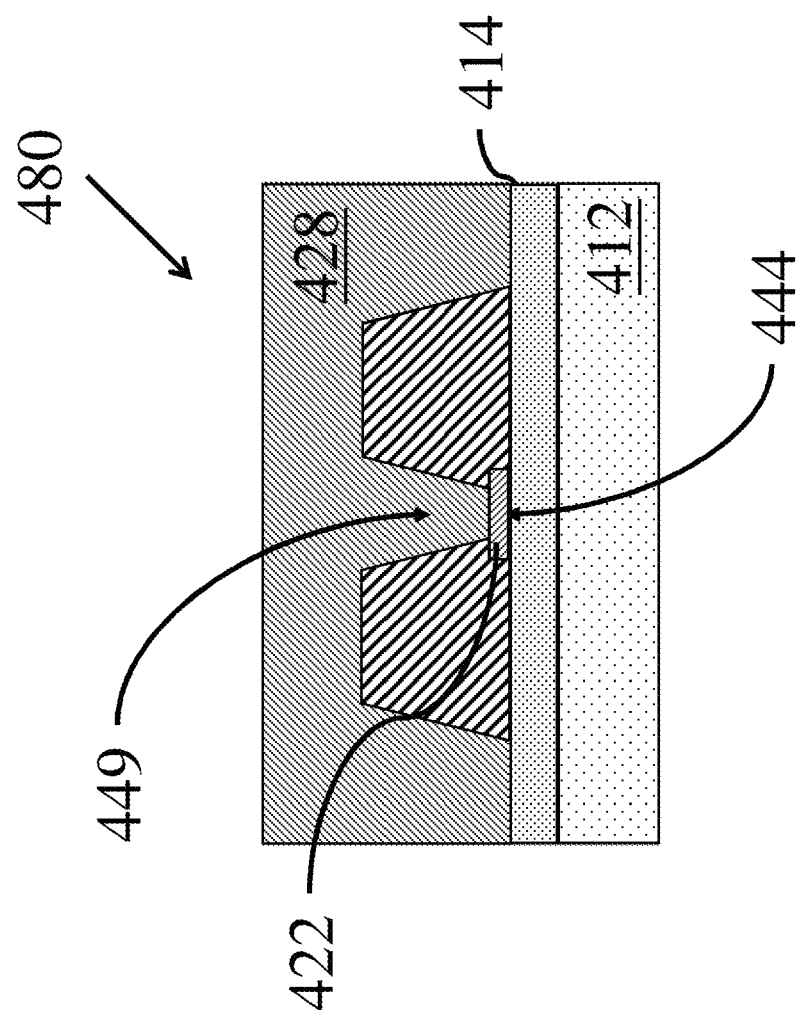

FIG. 7h depicts a deposition step 480 (step 520 in FIG. 9) wherein a metal layer 428 is deposited encasing a top side of the PR structure 426, the oxide layer 422 and the metal layer 414. Step 480 completes a fabrication sequence and produces the embodiment of a half bowtie optical antenna similar to the optical antenna 200 as described with reference to 5. In the embodiment a gap 444 is formed by the thin oxide layer 422 and a metal tip 449 is formed from the metal layer 428.

Figure 2:
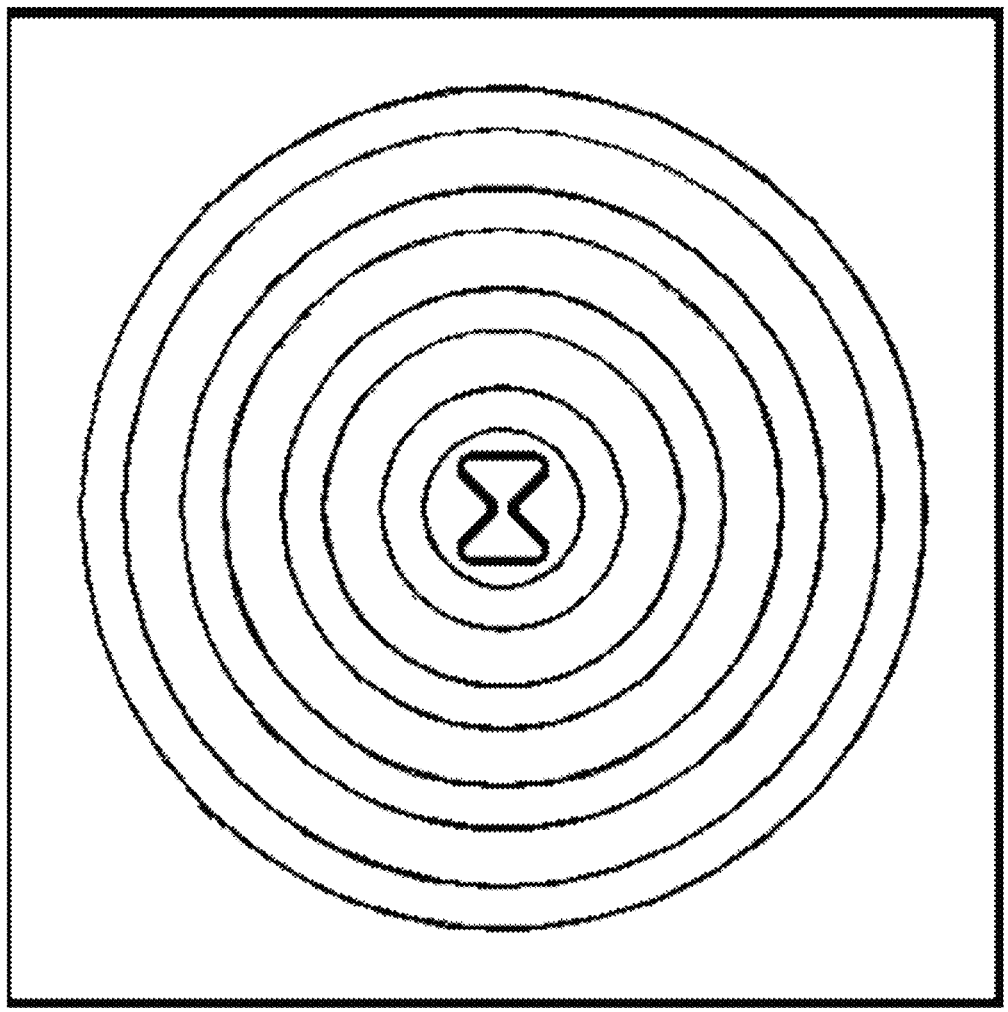
FIG. 2 is a schematic of the full bowtie field intensity and how the arrangement can boost the field intensity by more than one order of magnitude.

If desired, a grating can be added to focus light onto the aperture such as depicted in FIG. 2 Once the basic structure of a half bowtie is made grooves filled with oxide can be made.

Figure 8B:
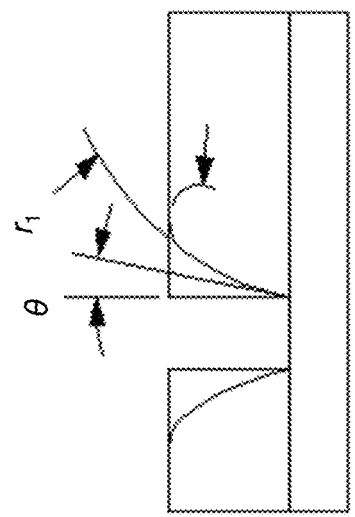
Figure 8A:
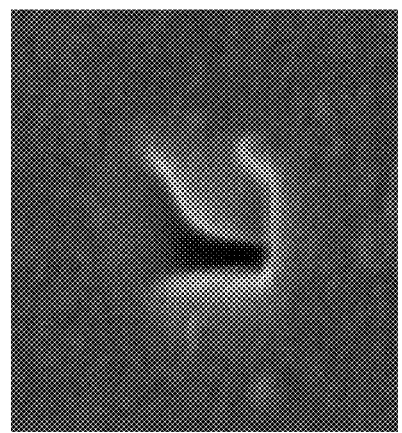
FIG. 8a is a scanning electron microscopy (SEM) image of a half bowtie fabricated using focused ion beam (FIB) milling.

Advantageously, the method to fabricate the half bowtie NFT using the disclosed method results in the fabricated gap that is straight. FIG. 8a shows a scanning electron microscopy (SEM) image of half bowtie fabricated using focused ion beam (FIB) milling. The cross section of the produced half bowtie at the gap is illustrated in FIG. 8b to show the taper of the gap, characterized by an angle θ and a radius of curvature $r_1$. Such taper increases the gap size at the top surface, greatly reducing the capability of focusing light using NFT. The disclosed fabrication method circumvents this fabrication issue, and will produce a gap with straight wall that guarantee a spot size to be determined by the thickness of the oxide layer 422.

Those skilled in the art will recognize that numerous modifications can be made to the specific implementations described above. The implementations should not be limited to the particular limitations described. Other implementations may be possible.

The invention claimed is:

1. An antenna for heat assisted magnetic recording, comprising:
   an optically opaque material; and
   an optically transparent material disposed on the optically opaque material, the optically transparent material including a half bowtie shape having
      a first half-wing substantially shaped in form of trapezoid, having a height substantially equal to the overall height of the half bowtie;
      a second half-wing substantially shaped in form of a mirror image of the first half-wing and formed proximate and coupled to the first half-wing by a substantially rectangular aperture having a tip width and an aperture gap,
      the aperture gap as small as between 1 nm to 5 nm.

2. The antenna for heat assisted magnetic recording of claim 1, the optically opaque material is metal.

3. The antenna for heat assisted magnetic recording of claim 1, the optically transparent material is silicon dioxide, metal oxide, or combinations thereof.

4. The antenna for heat assisted magnetic recording of claim 1, the optically opaque material and the optically transparent material form a vertical structure.

* * * * *